(12) United States Patent
Conway et al.

(10) Patent No.: US 11,767,957 B2
(45) Date of Patent: Sep. 26, 2023

(54) HEADLAMP HEATER

(71) Applicant: PACCAR Inc, Bellevue, WA (US)

(72) Inventors: Scott M. Conway, Flower Mound, TX (US); Thomas Hilsenbeck, Erwitte-Stirpe (DE); Roman Kopecky, Lostice (CZ)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 17/237,492

(22) Filed: Apr. 22, 2021

(65) Prior Publication Data

US 2021/0341121 A1    Nov. 4, 2021

Related U.S. Application Data

(60) Provisional application No. 63/017,846, filed on Apr. 30, 2020.

(51) Int. Cl.
*F21S 41/25* (2018.01)
*B60Q 1/06* (2006.01)

(52) U.S. Cl.
CPC ............ *F21S 41/25* (2018.01); *B60Q 1/06* (2013.01)

(58) Field of Classification Search
None
See application file for complete search history.

(56) References Cited

U.S. PATENT DOCUMENTS

| | | | | |
|---|---|---|---|---|
| 11,066,047 B1* | 7/2021 | Keller | ............ | H05B 3/84 |
| 2016/0215952 A1* | 7/2016 | Dunn | ............ | F21S 45/60 |
| 2016/0363286 A1* | 12/2016 | Deering | ............ | F21S 43/14 |
| 2017/0234503 A1* | 8/2017 | Buffone | ............ | F21S 41/39 |
| | | | | 362/509 |
| 2018/0363878 A1* | 12/2018 | Potluri | ............ | F21S 41/25 |
| 2019/0017676 A1* | 1/2019 | Van Straten | ............ | F21S 41/141 |
| 2019/0017677 A1* | 1/2019 | Beauchamp | ............ | F21S 41/20 |
| 2019/0086054 A1* | 3/2019 | Iwao | ............ | B60R 13/04 |
| 2019/0283658 A1* | 9/2019 | Furui | ............ | G01S 17/931 |
| 2020/0056756 A1* | 2/2020 | Kim | ............ | F21S 41/25 |
| 2020/0072435 A1* | 3/2020 | Mayer | ............ | F21S 45/48 |
| 2020/0247708 A1* | 8/2020 | Priese | ............ | C03B 27/00 |
| 2020/0300440 A1* | 9/2020 | Monpremier | ............ | F21S 43/14 |
| 2020/0340660 A1* | 10/2020 | Van Straten | ............ | H05B 3/18 |
| 2021/0088197 A1* | 3/2021 | Koulouh | ............ | F21S 45/33 |
| 2021/0148539 A1* | 5/2021 | Ting | ............ | H05B 1/0236 |
| 2021/0302006 A1* | 9/2021 | Deng | ............ | H01R 4/4863 |
| 2021/0339709 A1 | 11/2021 | Conway | | |

FOREIGN PATENT DOCUMENTS

CN      109185826 A    *    1/2019

* cited by examiner

*Primary Examiner* — Elmito Breval
(74) *Attorney, Agent, or Firm* — Merchant & Gould P.C.

(57) ABSTRACT

Examples of the present disclosure relate to a headlamp heater for a headlamp assembly. In examples, a headlamp assembly comprises a heating element, which directs radiation toward a lens of the headlamp assembly in order to prevent or remove condensation/precipitation on the lens. In examples, the heating element is an infrared heating element, and the wavelength of radiation emitted by the heating element is selected to be a wavelength that excites water. In some examples, the heating element is angled toward the lens and/or has multiple angled surfaces, thereby altering the radiation pattern that is directed toward the lens such that it better matches the beam pattern of a light source in the headlamp assembly.

18 Claims, 3 Drawing Sheets

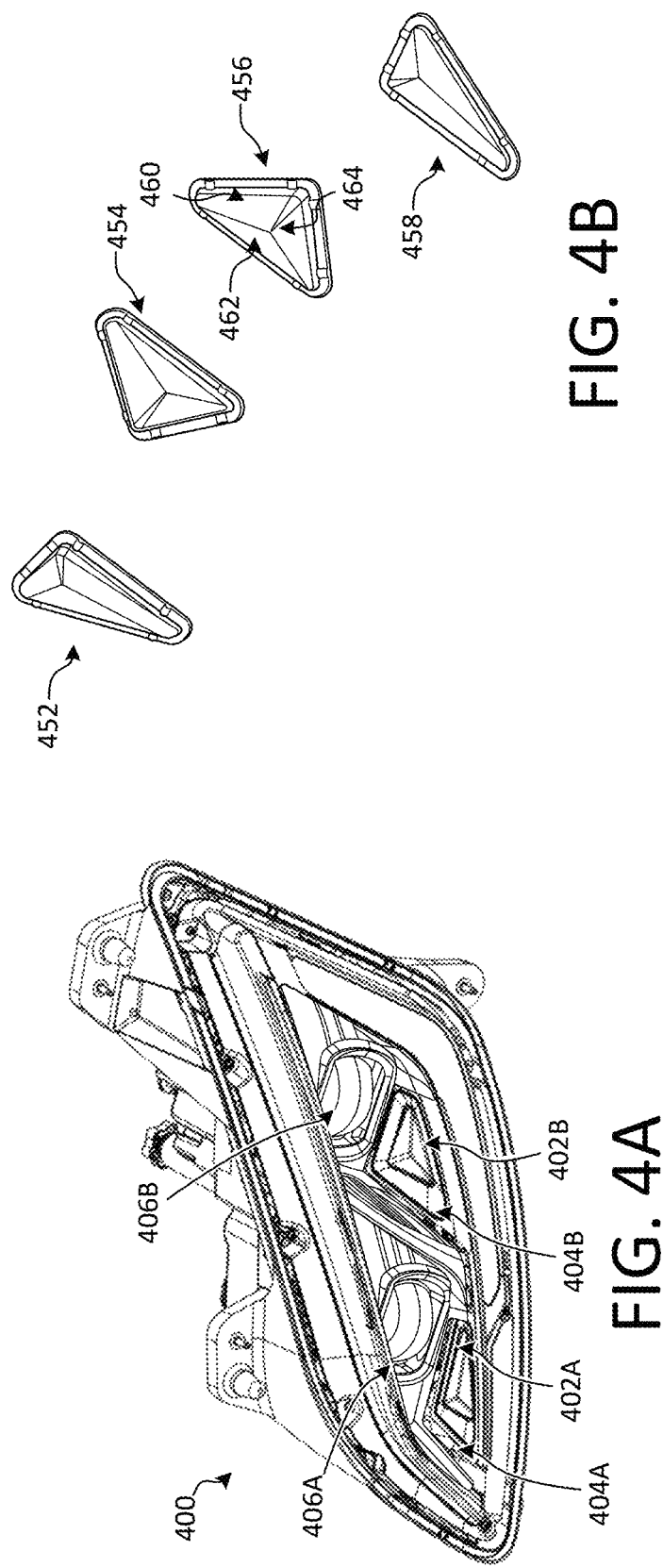

HEADLAMP HEATER

CROSS-REFERENCE TO RELATED APPLICATIONS

This application claims the benefit of U.S. Provisional Application No. 63/017,846, filed Apr. 30, 2020, the complete disclosure of which is hereby incorporated herein by reference in its entirety.

BACKGROUND

Depending on the light source used in a headlamp assembly of an automotive vehicle, the heat generated by the light source may be insufficient to reduce or otherwise prevent condensation/precipitation on the lens of the headlamp assembly. Further, certain techniques to address such issues may lack durability or may affect the lifespan of the headlamp assembly or parts therein.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure relate to a headlamp heater for a headlamp assembly. In examples, a headlamp assembly comprises a heating element, which directs radiation toward a lens of the headlamp assembly in order to prevent or remove condensation/precipitation on the lens. For example, the heating element stimulates convection within the headlamp assembly, which may remove condensation on the inside of the lens. As another example, the heating element may cause sublimation or thawing of accumulated ice/snow on the outside of the lens, thereby clearing the outside of the lens. In examples, the heating element is an infrared heating element, and the wavelength of radiation emitted by the heating element is selected to be a wavelength that excites water. In some examples, the heating element is angled toward the lens and/or has multiple angled surfaces, thereby altering the radiation pattern that is directed toward the lens such that it better matches the beam pattern of a light source in the headlamp assembly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4A illustrates a front view of an example headlamp assembly.

FIG. 4B illustrates a perspective view of example heating elements.

DETAILED DESCRIPTION

Figure 2:
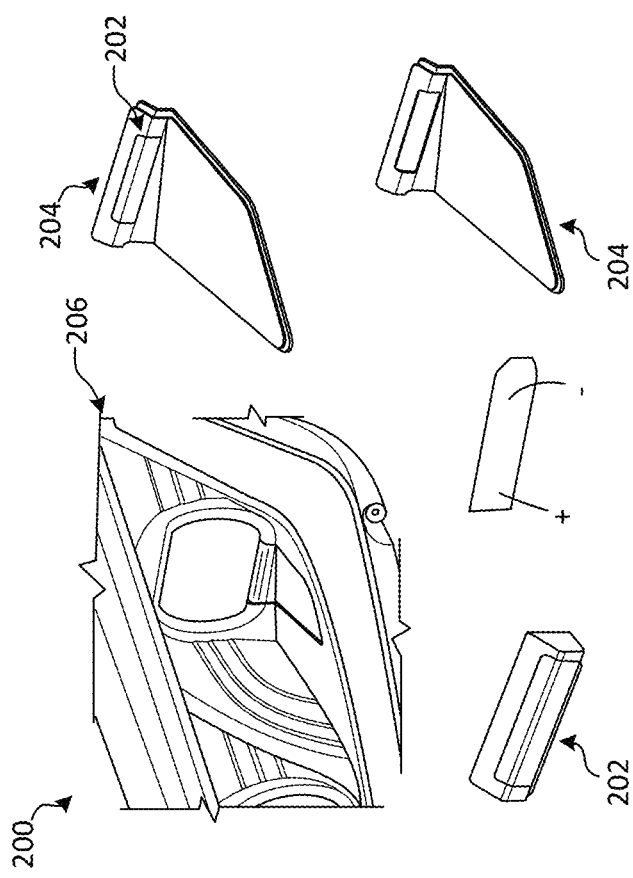
FIG. 2 illustrates an exploded view of an example headlamp assembly.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. The following detailed description is therefore not to be taken in a limiting sense, and the scope of the present disclosure is defined by the appended claims and their equivalents.

A headlamp assembly of an automotive vehicle may use any of a variety of light sources, including, but not limited to, one or more light-emitting diodes (LEDs), lasers, high-intensity discharge lamps, and/or tungsten-halogen lamps. In examples, the light source does not generate enough heat to prevent condensation or precipitation from accumulating on the lens or to thaw precipitation that has already accumulated on the lens. In some examples, a fan is used to stimulate a convective current within the headlamp assembly or, in other examples, move warm air toward the lens. For example, air may be circulated within the headlamp assembly (e.g., via a partial pressure differential in a halogen lamp, by circulating heat from a heatsink associated with an LED light source, etc.). As another example, air may be moved from the engine compartment of the vehicle to the headlamp assembly. In other examples, resistive wire may be embedded in the lens itself, thereby enabling the lens to be warmed using the resistive wire.

However, such techniques may lack durability or may affect the lifespan of the headlamp assembly or parts therein. For example, the service life of a fan may be substantially shorter than that of the vehicle, such that the fan may need to be routinely serviced or replaced. Additionally, resistive wire may experience electrical failure, may ablate through cyclic use, may affect the beam pattern and aesthetics of the headlamp, or may crack or craze the lens through use. Accordingly, aspects described herein relate to a headlamp heater, in which a heating element is used to direct radiation toward the lens of the headlamp assembly.

In examples, the heating element comprises an infrared emitter (e.g., a ceramic matrix), a coil of resistive wire embedded in the emitter, a set of leads (e.g., to power the wire, for an integrated temperature sensor, etc.). In some examples, the surface of the emitter is comprised of a set of angled surfaces to direct the radiation emitted by the heating element. It will be appreciated that any of a variety of emitters may be used, including, but not limited to, ceramic, quartz, or carbon emitters. In some examples, the output of the heating element may be tuned based at least in part on the diameter of the coil, the gauge of the wire, the shape of the emitter surface, and the glaze of the emitter surface, among other examples. In some examples, the wavelength of radiation emitted by the heating element is selected to be a wavelength that excites water (e.g., 4.4 µm, between 2-10 µm, etc.).

A headlamp assembly is adapted to receive power from a power source of a vehicle (e.g., a battery, an alternator, etc.). In examples, a light source and heating element of the headlamp assembly are controllable via one or more control elements of the vehicle. For example, the light source or heating element may be controlled manually via a switch, potentiometer, etc. or automatically by an electronic control unit based on a temperature sensor or light sensor, among other examples. In other examples, the headlamp assembly may comprise a control element, for example a temperature sensor based on which the heating element is activated. It will be appreciated that the light source and heating element may be individually or independently controllable and may be controlled based on a variety of other control techniques. Where multiple light sources and heating elements are included in the headlamp assembly, each light source and each heating element may be individually or independently controlled.

It will be appreciated that while aspects described herein are discussed in the context of a headlamp assembly for an automotive vehicle, similar techniques may be used for lenses associated with any of a variety of other lighting (e.g., low beam headlights, high beam headlights, tail lights, signal lights, running lights, fog lights, brake lights, etc.) and may be used for any of a variety of vehicle types.

Figure 1:
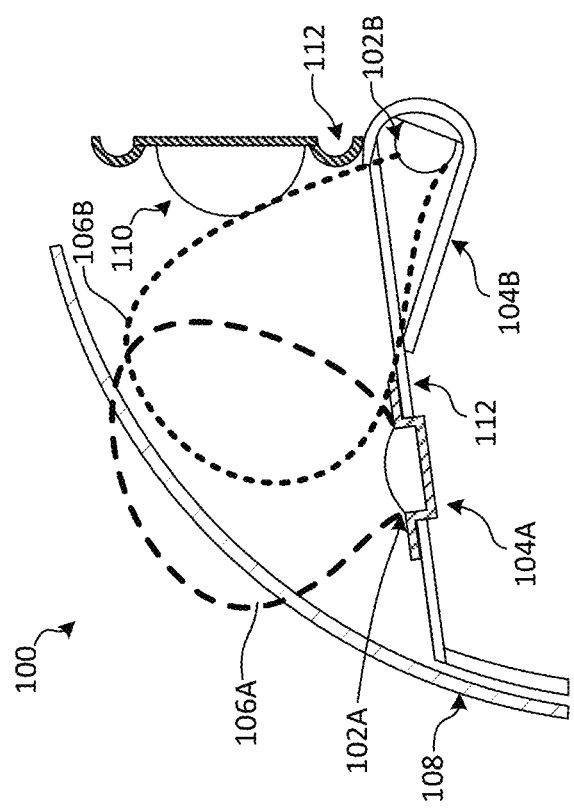
FIG. 1 illustrates a side view of an example headlamp assembly.

FIG. 1 illustrates a side view of an example headlamp assembly 100. As illustrated, headlamp assembly 100 comprises heating elements 102A and 102B, brackets 104A and 104B, radiation patterns 106A and 106B, lens 108, light source 110, and housing 112. Light source 110 projects a beam pattern through lens 108, thereby illuminating a path in front of the vehicle. However, as described above, light source 110 may not radiate enough heat toward lens 108 to prevent or otherwise remove condensation or precipitation. Accordingly, example headlamp assembly 100 comprises heating elements 102A and 102B, which are mounted in brackets 104A and 104B and generate radiation patterns 106A and 106B, respectively. Thus, heating elements 102A and 102B direct infrared radiation toward lens 108 in order to prevent or otherwise remove condensation or precipitation.

Brackets 104A and 104B retain heating elements 102A and 102B, respectively, in place. In examples, brackets 104A and 104B are made of a heat-resistant material (e.g., metal, thermoset plastic, etc.) and are used to avoid damage to housing 112. In other examples, brackets 104A and 104B may be omitted, such that heating elements 102A and 102B are retained directly by housing 112. As another example, heating elements 102A and 102B may be off-the-shelf or otherwise standard heating elements, and brackets 104A and 104B may be designed according to the geometry of housing 112 in order to retain heating elements 102A and 102B without customization or other modification to heating elements 102A and 102B.

As illustrated, heating element 102A is positioned at the base of lens 108, thereby radiating energy upward across the interior of lens 108. By contrast, heating element 102B is positioned beneath light source 110 and angled toward lens 108, thereby radiating energy toward lens 108 from a greater distance. Thus, it will be appreciated that a heating element may be positioned within a headlamp assembly at any of a variety of positions, and need not be restricted to the positions illustrated by heating elements 102A and 102B. For example, the positioning of the heating element may be dependent at least in part on the headlamp housing geometry, headlamp lens geometry, type of heating element, and/or energy output of the heating element. In another example, a heating element may be separate from the lens 108 and does not contact the lens 108. Further, the heating element has a highest point (e.g., depending on the geometry or shape of the heating element) and may be positioned beneath a light source 110 such that the highest point of the heating element is below a direct beam path between the light source 110 and the lens 108 (e.g., a direct path of a beam pattern emitted from the light source 110 towards the lens 108 is unobstructed by the heating element). Additionally or alternatively, a highest point of the heating element may be positioned below a lowest point of the lens 108. Further, any number of heating elements may be used, such that additional or fewer heating elements may be incorporated into a headlamp assembly.

FIG. 2 illustrates an exploded view 200 of an example headlamp assembly. As illustrated, view 200 comprises housing 206, heating element 202, and bracket 204. Certain aspects of heating element 202, bracket 204, and housing 206 may be similar to heating elements 102A and 102B, brackets 104A and 104B, and housing 112 of FIG. 1, respectively, and may therefore not be re-described below in detail. As illustrated, heating element 202 comprises four leads: a "+" lead and a "−" lead for powering heating element 202, as well as two additional leads for a temperature sensor integrated therein. In other examples, heating element 202 may not comprise a temperature sensor or a separate temperature sensor may instead be used.

FIG. 2 states that bracket 204 is steel, though, as noted above, any of a variety of other materials may be used. Further, housing 206 is illustrated as being high-temperature polycarbonate, though it will be appreciated that any of a variety of other materials may be used. As noted above with respect to FIG. 1, heating element 202 may be an off-the-shelf or otherwise standard heating element, and bracket 204 may be designed according to the geometry of housing 206 in order to retain heating element 202 without customization or other modification. In examples, bracket 204 provides structural support to heating element 202, such as in instances where heating element 202 is large or has a long aspect ratio and may therefore be susceptible to cracking. In other examples, bracket 204 may retain multiple smaller heating elements rather than one larger heating element (e.g., heating element 202).

Figure 3C:
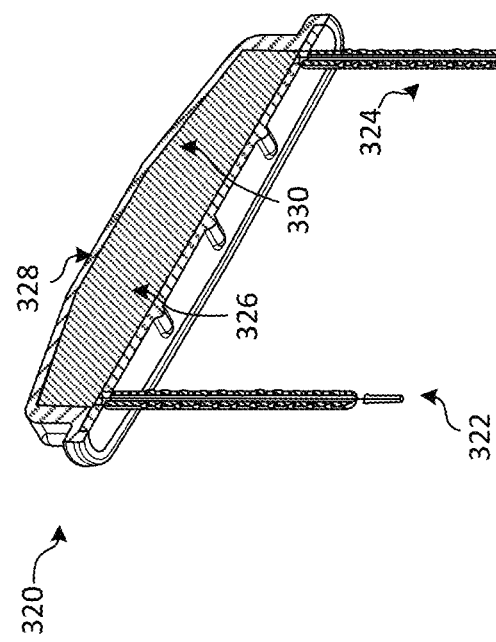
FIG. 3C illustrates a cross-sectional view of an example heating element.
Figure 3D:
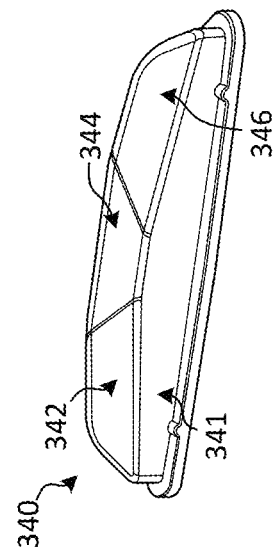
FIG. 3D illustrates a perspective view of an example heating element.
Figure 3A:
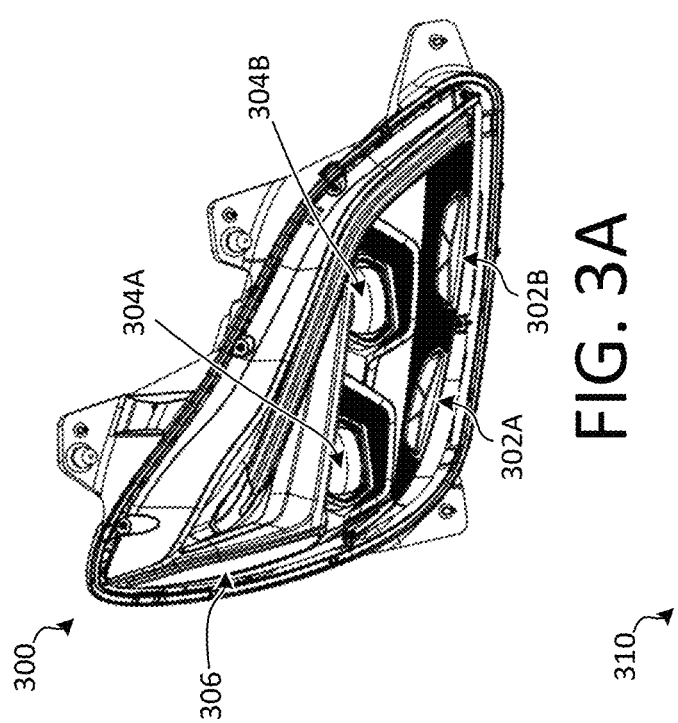
FIG. 3A illustrates a front view of an example headlamp assembly.
Figure 3B:
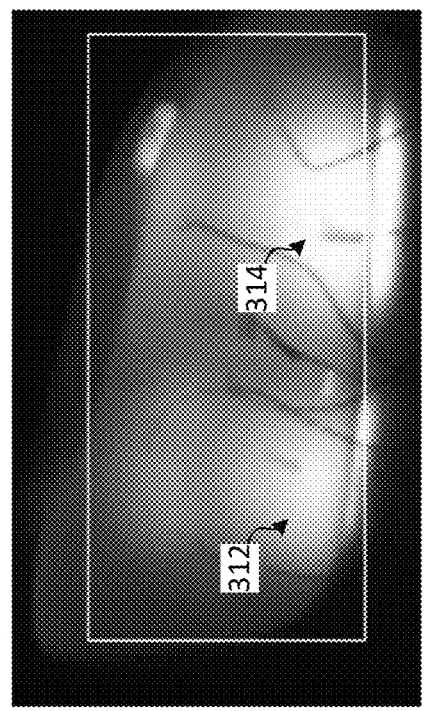
FIG. 3B illustrates front view of an example headlamp assembly from an infrared camera.

FIG. 3A illustrates a front view of an example headlamp assembly 300. As illustrated, headlamp assembly 300 comprises heating elements 302A and 302B, light sources 304A and 304B, and lens 306. Light source 304A and 304B each project a beam pattern through lens 306, thereby illuminating a path in front of the vehicle. Heating elements 302A and 302B are positioned at the base of lens 306, thereby enabling infrared energy to radiate upward along at least a region of lens 306 (e.g., as may be associated with the respective beam patterns of light sources 304A and 304B). For example, FIG. 3B illustrates front view 310 of headlamp assembly 300 from an infrared camera while heating elements 302A and 302B are powered on. Radiation patterns 312 and 314 in FIG. 3B radiate from heating elements 302A and 302B, respectively, and illustrate the regions of lens 306 that are heated by heating elements 302A and 302B.

Returning to FIG. 3A, heating elements 302A and 302B are positioned at the bottom of headlamp assembly 300 so as to maintain the aesthetics of headlamp assembly 300. For example, as compared to resistive wire (which would be visible within lens 306 and may affect the beam pattern of light sources 304A and 304B), heating elements 302A and 302B are less visible from the exterior of headlamp assembly 300 and simplify the production of lens 308. In some examples, the geometry of lens 308 may be such that it is technically difficult or not technically possible to integrate resistive wire into the lens.

Further, heating elements 302A and 302B are positioned along the respective beam paths from light sources 304A and 304B through lens 308, such that only a region of lens 308 is heated by the radiation pattern (not pictured) of heating elements 302A and 302B. Thus, it will be appreciated that the entire lens 306 need not be heated, which saves energy. Further, while headlamp assembly 300 is illustrated as comprising two light sources 304A and 304B and two associated heating elements 302A and 302B, it will be appreciated that any number of light sources and/or heating elements may be used. For example, one heating element may be used to heat multiple regions of lens 308 for the beam patterns associated with light sources 304A and 304B.

FIG. 3C illustrates a cross-sectional view of an example heating element 320. Heating element 320 is illustrated as comprising infrared emitter 326, wire 330, emitter surface 328, and leads 322 and 324. Infrared emitter 326 and emitter surface 328 may be a ceramic, quartz, or carbon emitter, among other examples. In examples, infrared emitter 326 may comprise one or more hollow cavities and/or heat shielding material, thereby protecting nearby components (e.g., a light source, a bracket, a housing, etc.) from radiation produced by heating element 320. Emitter surface 328 may have a set of angled surfaces to direct emitted radiation according to aspects described herein. Leads 322 and 324 are used to power wire 330 that is embedded in infrared emitter 326 (e.g., from a power source of a vehicle according to one or more control elements). In example, wire 330 is embedded in infrared emitter 326 as a coil and may be any of a variety of materials, including, but not limited to, tungsten, a nickel and chrome alloy, or carbon. As an example, heating element 320 may receive 100 watts of power at 13.8 volts via leads 322 and 324. In such examples, a circuit comprising two heating elements (e.g., as illustrated in headlamp assembly 300 in FIG. 3A having heating elements 302A and 302B) would draw approximately 14.5 amps in total, such that a 20-amp automotive fuse may be used for the heating element circuit. Thus, the electrical specifications of heating element 320 may be selected according to the available fuses and/or wiring of the automotive vehicle.

In examples, other heating elements described herein, such as heating elements 102A and 102B in FIG. 1 and heating element 202 in FIG. 2, may be of a similar form as heating element 320 or, in other examples, may be of a different form (e.g., having more leads, a different emitter surface shape, etc.). Further, while example current, amps, and voltages are described herein, it will be appreciated that any of a variety of other specifications may be used.

FIG. 3D illustrates a perspective view of an example heating element 340. As illustrated, heating element 340 comprises emitter surface 341 having angled surfaces 342, 344, and 346, which affect the radiation pattern of heating element 340. Referring to FIG. 3A, heating element 340 having angled surfaces 342, 344, and 346 may be used to increase the area/alter the shape of the radiation directed toward lens 306, thereby adapting the heated region of lens 306 to better match the beam pattern generated by light source 304A or 304B. Thus, each angled surface 342, 344, and 346 may each direct radiation to a sub-region. For example, angled surface 342 directs radiation to the left of a region in front of heating element 340 (e.g., lens 306 in FIG. 3A), angled surface 344 directs radiation to the center of the region, and angled surface 346 directs radiation to the right of the region. Such geometry may be used in instances where the beam pattern of a light source is ellipsoidal (e.g., where the width of the beam pattern is greater than the height). Thus, angled surfaces 342, 344, and 346 enable heating element 340 to direct radiation to multiple sub-regions of a lens associated with beam pattern of a light source rather than requiring multiple flat-surfaced heating elements to achieve similar coverage. It will be appreciated that the geometry of heating element 340 is provided as an example and, in other examples, different geometries may be used. For example, rather than the illustrated geometry of heating element 340 or using off-the-shelf heating elements (e.g., heating elements 102A and 102B in FIG. 1), heating element geometry may be tailored based at least in part on the position of the heating element within the headlamp assembly and/or the beam pattern of one or more associated light sources.

FIG. 4A illustrates a front view of an example headlamp assembly 400. As illustrated, headlamp assembly comprises heating elements 402A and 402B, brackets 404A and 404B, and light sources 406A and 406B. Headlamp assembly 400 is provided as another example of a headlamp assembly comprising heating elements according to aspects described herein. Accordingly, it will be appreciated that headlamp assembly 400 comprises similar features as previously described headlamp assemblies and that such aspects are not necessarily re-described below in detail.

In examples, bracket 404A angles heating element 402A so as to direct more of the associated radiation pattern (not pictured) toward the lens (not pictured) than if the base of heating element 402A were positioned parallel to the bottom surface of the headlamp housing. Bracket 404B may be similarly angled to retain heating element 402B in a way that directs more of the associated radiation pattern (not pictured) toward the lens (not pictured).

FIG. 4B illustrates a perspective view of example heating elements 452, 454, 456, and 458 having different geometries. In examples, the heating elements 452-458 are used in headlamp assembly 400 in FIG. 4A. For example, heating elements 458 and 456 may be positioned as elements 402A and 402B (e.g., as a driver-side headlamp assembly), while heating elements 452 and 454 may be used in a headlamp assembly that substantially mirrors headlamp assembly 400 on the opposite side of the vehicle.

Similar to heating element 340 in FIG. 3D, heating elements 452-458 are each comprised of emitter surfaces having angled surfaces. Referring more specifically to heating element 456 as an example, the surface of heating element 456 is comprised of angled surfaces 460, 462, and 464, which affect the radiation pattern of heating element 456. Referring to FIG. 4A, heating element 456 having angled surfaces 460, 462, and 464 may be used to increase the area/alter the shape of the radiation that heats the lens of headlamp assembly 400, thereby adapting the region of the lens that is heated to match the beam pattern generated by light source 406B. Thus, it will be appreciated that the geometry of heating elements 452-458 are provided as examples and, in other examples, different geometries may be used based at least in part on the position of the heating element within the headlamp assembly and/or the beam pattern of one or more associated light sources.

This disclosure described some aspects of the present technology with reference to the accompanying drawings, in which only some of the possible embodiments were shown.

Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A headlamp assembly comprising:
   a lens;
   a light source having a beam pattern that is projected through the lens;
   a heating element positioned spaced apart from the lens and oriented to direct radiation to at least a region of the lens associated with the beam pattern;
   a light sensor configured to measure a brightness substantially at the lens; and
   an electronic control unit configured to control a brightness emitted from the light source and a radiation energy emitted from the heating element based on the brightness measured by the light sensor.

2. The headlamp assembly of claim 1, wherein:
   the heating element comprises an emitter surface having a plurality of angled surfaces; and
   each angled surface of the plurality of angled surfaces directs radiation to a sub-region of the region of the lens associated with the beam pattern.

3. The headlamp assembly of claim 2, wherein the emitter surface includes at least one of:
   a hollow cavity; and
   a heat shielding material.

4. The headlamp assembly of claim 1, wherein:
   the light source is a light-emitting diode; and
   the heating element is a ceramic infrared heating element.

5. The headlamp assembly of claim 1, wherein the radiation is at a wavelength that excites water.

6. The headlamp assembly of claim 1, wherein the radiation reduces precipitation or condensation from accumulating on the lens.

7. The headlamp assembly of claim 1, wherein the heating element is one of:
   a ceramic matrix;
   a coil of resistive wire; and
   a set of leads.

8. The headlamp assembly of claim 7, wherein a glaze or a shape of the ceramic matrix is tunable, wherein a diameter of the coil of resistive wire is tunable, and wherein a position of the set of leads is tunable.

9. The headlamp assembly of claim 1, wherein the headlamp assembly is coupled to a vehicle and is one of:
   a headlight;
   a tail light; and
   a signal light.

10. The headlamp assembly of claim 1, wherein the heating element is positioned near a base of the lens.

11. The headlamp assembly of claim 1, wherein the heating element is positioned below the light source such that a beam path between the light source and the lens is unobstructed by the heating element.

12. The headlamp assembly of claim 1, wherein the heating element is powered by a power source of a vehicle.

13. The headlamp assembly of claim 1, wherein the heating element is retained in the headlamp with a bracket.

14. The system of claim 13, wherein the electronic control unit controls the radiation energy emitted from the heating element based on temperature measured by the temperature sensor.

15. The system of claim 13, wherein the electronic control unit controls a source brightness emitted from the light source based on the brightness measured by the light sensor.

16. A system for heating a lens of a headlamp, the system comprising:
   a headlamp comprising:
      a lens;
      a light source having a beam pattern that is projected through the lens; and
      a heating element positioned to direct radiation to at least a region of the lens associated with the beam pattern;
   a temperature sensor for measuring a temperature substantially at the lens of the headlamp;
   a light sensor for measuring a brightness substantially at the lens of the headlamp;
   an electronic control unit for controlling a brightness emitted from the light source and a radiation energy emitted from the heating element based on at least one of the brightness or the temperature; and
   a power source of a vehicle electrically coupled to the light source, the heating element, and the electronic control unit.

17. A headlamp assembly comprising:
   a lens;
   a first light source having a first beam pattern that is projected through a first region of the lens;
   a second light source having a second beam pattern that is projected through a second region of the lens;
   a first heating element positioned spaced apart from the lens and oriented to direct a first radiation energy to at least the first region of the lens associated with the first beam pattern, the first heating element secured by a first bracket;
   a second heating element positioned spaced apart from the lens and oriented to direct a second radiation energy to at least the second region of the lens associated with the second beam pattern, the second heating element secured by a second bracket;
   at least one light sensor configured to measure a brightness substantially at the lens; and
   an electronic control unit configured to control a brightness emitted from at least one of the first light source or the second light source, the electronic control unit being configured to control a radiation energy emitted from at least one of the first heating element or the second heating element based on at least one of the brightness measured by the at least one light sensor.

18. The headlamp assembly of claim 17, wherein the first heating element includes an emitter surface comprising at least three substantially flat surfaces, each surface of the at least three substantially flat surfaces positioned at a different angle relative to the lens.

* * * * *